US010155351B2

(12) United States Patent
Marchini et al.

(10) Patent No.: US 10,155,351 B2
(45) Date of Patent: Dec. 18, 2018

(54) PROCESS AND APPARATUS FOR MANUFACTURING TYRES

(71) Applicant: Pirelli Tyre S.p.A., Milan (IT)

(72) Inventors: Maurizio Marchini, Milan (IT); Cesare Amurri, Milan (IT); Gianni Mancini, Milan (IT); Gaetano Lo Presti, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 345 days.

(21) Appl. No.: 14/940,906

(22) Filed: Nov. 13, 2015

(65) Prior Publication Data

US 2016/0067935 A1 Mar. 10, 2016

Related U.S. Application Data

(62) Division of application No. 12/451,948, filed as application No. PCT/IB2007/052190 on Jun. 11, 2007, now Pat. No. 9,216,551.

(51) Int. Cl.
*B29D 30/24* (2006.01)
*B29D 30/20* (2006.01)
(Continued)

(52) U.S. Cl.
CPC ............. *B29D 30/20* (2013.01); *B29D 30/24* (2013.01); *B29D 30/242* (2013.01);
(Continued)

(58) Field of Classification Search
CPC ...... B29D 30/20; B29D 30/24; B29D 30/242; B29D 30/244; B29D 30/3042;
(Continued)

(56) References Cited

U.S. PATENT DOCUMENTS 3,607,558 A 9/1971 Nebout
3,658,999 A 4/1972 Tangorra et al.
(Continued)

FOREIGN PATENT DOCUMENTS

CN 1895097 A 1/2007
DE 199 13 241 C1 9/2000
(Continued)

OTHER PUBLICATIONS

Notification of the First Office Action dated May 3, 2012 by State Intellectual Property Office of the People's Republic of China in corresponding Chinese Application No. 200780053285.3 (6 pages).
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A plurality of strip-like elements is applied onto a forming drum externally having a substantially cylindrical laying surface. The strip-like elements are disposed in mutually approached relationship to form at least one first annular reinforcing layer on the forming drum itself set to a first work diameter at which each of the applied strip-like elements on the laying surface subtends an arc of a circumference of a width as large as a submultiple integer of the overall circumferential extension of the laying surface itself. Adjustment devices operating on the forming drum subsequently carry out expansion of the latter to a second work diameter larger than the first work diameter, while maintaining its laying surface substantially cylindrical.

15 Claims, 8 Drawing Sheets

(51) Int. Cl.
*B29D 30/30* (2006.01)
*B29D 30/70* (2006.01)
B29D 30/26 (2006.01)
B29D 30/08 (2006.01)

(52) U.S. Cl.
CPC ......... *B29D 30/245* (2013.01); *B29D 30/246* (2013.01); *B29D 30/305* (2013.01); *B29D 30/3028* (2013.01); *B29D 30/70* (2013.01); B29D 2030/082 (2013.01); B29D 2030/2642 (2013.01); B29D 2030/2678 (2013.01); B29D 2030/705 (2013.01)

(58) Field of Classification Search
CPC .............. B29D 30/305; B29D 30/3057; B29D 30/3021; B29D 30/3028; B29D 30/70; B29D 2030/202; B29D 2030/2642; B29D 2030/2678; B29D 2030/705
See application file for complete search history.

(56) References Cited

U.S. PATENT DOCUMENTS

| | | | |
|---|---|---|---|
| 3,888,720 A * | 6/1975 | Habert | B29D 30/24 156/414 |
| 4,846,907 A | 7/1989 | Kumagai et al. | |
| 4,923,554 A | 5/1990 | Ozawa | |
| 5,308,437 A | 5/1994 | Osa | |
| 5,635,016 A * | 6/1997 | Byerley | B29D 30/242 156/406.2 |
| 6,039,826 A | 3/2000 | Okada | |
| 6,343,638 B1 | 2/2002 | Weaver et al. | |
| 6,702,913 B2 | 3/2004 | Marchini et al. | |
| 7,041,185 B2 | 5/2006 | Caretta et al. | |
| 7,241,353 B2 | 7/2007 | Tokunaga | |
| 2002/0153083 A1 | 10/2002 | Takagi | |
| 2005/0178468 A1 | 6/2005 | Suda et al. | |
| 2006/0011285 A1 | 1/2006 | Suda | |
| 2006/0027309 A1 | 2/2006 | Hayashi et al. | |
| 2006/0042737 A1 | 3/2006 | Hayashi | |
| 2006/0086451 A1 | 4/2006 | Nakata | |
| 2006/0124233 A1 | 6/2006 | Mizota | |
| 2006/0130959 A1 | 6/2006 | Lacagnina | |
| 2006/0137805 A1 | 6/2006 | Auclair | |
| 2007/0102090 A1 | 5/2007 | Kabe et al. | |
| 2007/0261780 A1 | 11/2007 | Linne et al. | |
| 2008/0017298 A1 | 1/2008 | Iyanagi | |

FOREIGN PATENT DOCUMENTS

| | | |
|---|---|---|
| EP | 0 091 542 A1 | 10/1983 |
| EP | 1 127 683 A2 | 8/2001 |
| EP | 1 555 113 A1 | 7/2005 |
| EP | 1 570 978 A1 | 9/2005 |
| EP | 1 650 014 A1 | 4/2006 |
| EP | 1 724 099 A1 | 11/2006 |
| WO | WO 2004/041520 A1 | 5/2004 |
| WO | WO-2005/0535062-A1 | 7/2005 |
| WO | WO 2008/003054 A1 | 1/2006 |

OTHER PUBLICATIONS

English-language translation of Notification of the First Office Action dated May 3, 2012 by State Intellectual Property Office of the People's Republic of China in corresponding Chinese Application No. 200780053285.3 (8 pages).

English-language International Search Report from the European Patent Office in PCT/IB2007/052190, dated Mar. 3, 2008.

Englsh-language Written Opinion from the International Searching Authority in PCT/IB2007/052190, dated Mar. 3. 2008.

* cited by examiner

PROCESS AND APPARATUS FOR MANUFACTURING TYRES

CROSS REFERENCE TO RELATED APPLICATIONS

This application is a divisional of U.S. application Ser. No. 12/451,948, filed Dec. 9, 2009, which is a national phase application based on PCT/IB2007/052190, filed Jun. 11, 2007, the content of both of which is incorporated herein by reference.

BACKGROUND OF THE INVENTION

Field of the Invention

The present invention relates to a process and an apparatus for producing tyres.

More particularly, the invention is mainly addressed to the process and equipment that, as regards building of green tyres, are used for making annular reinforcing elements or layers such as carcass plies and/or belt layers being part of the tyre under manufacture.

DESCRIPTION OF THE RELATED ART

A tyre for vehicle wheels generally comprises a carcass structure including at least one carcass ply having respectively opposite end flaps in engagement with respective annular anchoring structures, integrated into the regions usually identified as "beads" and defining the radially internal circumferential edges of the tyre.

Associated with the carcass structure is a belt structure comprising one or more belt layers disposed in radially superposed relationship with respect to each other and to the carcass ply and having textile or metallic reinforcing cords with a crossed orientation and/or substantially parallel to the circumferential extension direction of the tyre. Applied to the belt structure at a radially external position is a tread band also made of elastomeric material like other semifinished products constituting the tyre.

Respective side walls of elastomeric material are also applied, at an axially external position, to the side surfaces of the carcass structure, each extending from one of the side edges of the tread band until close to the respective annular anchoring structure to the beads. In tyres of the tubeless type, an airtight coating layer usually referred to as "liner" covers the inner surfaces of the tyre.

In the most widespread production processes the carcass plies are made starting from an article of manufacture in the form of a continuous strip made up of cords of textile material or in some cases metallic material, that are disposed parallel to each other in a matrix of elastomeric material. From the continuous strip a section is cut, the length of which corresponds to the circumferential extension of the carcass ply to be obtained. The section is wound around the outer surface of a building drum, and the opposite ends are mutually joined so as to form a carcass ply.

Likewise, each of the belt layers is in turn made through winding of a section obtained from a semifinished product in a continuous strip, on an auxiliary drum. The belt structure thus formed, possibly coupled to the tread band, is subsequently picked up from the auxiliary drum for coupling to the carcass structure.

To the aims of the present specification and the appended claims, by "strip-like element" it is intended a long narrow element that in cross section has a profile of flattened conformation and comprising one or more cords of textile and/or metallic material extending parallel to the longitudinal extension of the strip-like element itself and incorporated in, or at least partly coated by, at least one layer of elastomeric material.

In U.S. Pat. No. 7,041,185 in the name of the same Applicant, the carcass plies are obtained by means of strip-like elements made up of rubberised cords, circumferentially laid in mutually approached relationship on the outer surface of a toroidal forming support the shape of which substantially matches that of the inner conformation of the tyre being processed. One or more belt layers are subsequently formed by means of respective strip-like elements circumferentially laid in mutually approached relationship on the carcass ply or plies carried by the toroidal forming support.

In document EP 1 555 113, reinforcing components of a tyre such as carcass plies and belt layers, are made through laying of individual rubberised cords circumferentially disposed close to each other on a cylindrical forming drum.

The Applicant has noticed that the same type of strip-like element or rubberised cord (which is nothing but a strip-like element comprising a single cord) depicted in U.S. Pat. No. 7,041,185 B2 or EP 1 555 113 can be utilised for manufacturing tyres of different sizes, provided the outer circumferential extension of the forming drum used corresponds' to a multiple integer of the arc of a circumference subtended by each strip-like element on the surface of the drum itself. The Applicant has noticed that this condition is affected not only by the circumferential extension of the drum itself, but also at least by the width sizes of the strip-like elements used and by the laying angle of said strip-like elements on the surface of the forming drum.

The Applicant has therefore inferred that in order to meet this condition a specific drum is required to be used for each size and type of tyre to be manufactured, to be combined with specific equipment adapted to make strip-like elements of suitable width.

SUMMARY OF THE INVENTION

The Applicant has felt the necessity to make structural components of the tyre through laying of strip-like elements, without being obliged to submit to the above described constraints.

The Applicant has found that by laying the strip-like elements on a surface having a diameter corresponding to a multiple integer of the arc of a circumference subtended by the individual strip-like element, and subsequently expanding the drum to the desired diameter, distribution of the strip-like elements is in compliance with the design specifications and is not linked to the extension of the laying surface of the forming drum.

In more detail, in accordance with a first aspect, the invention relates to a process for producing tyres comprising at least the step of manufacturing at least one first annular reinforcing layer during building of each tyre; wherein manufacture of said at least one first annular reinforcing layer comprises the steps of: providing a forming drum externally having a substantially cylindrical laying surface; applying a plurality of strip-like elements onto the forming drum; wherein during said applying step the strip-like elements are laid in mutually approached relationship according to the circumferential extension of said laying surface, to form said at least one first annular reinforcing layer; wherein before the applying step, the forming drum is set to a first work diameter, of such a value that each of the strip-like elements applied thereto, on the laying surface subtends an arc of a circumference of a width corresponding to a submultiple integer of the overall circumferential extension of the laying surface itself; wherein after said applying step, the forming drum is radially expanded while keeping its laying surface to a substantially cylindrical shape, up to a predetermined second work diameter, to determine a permanent expansion of said at least one first annular reinforcing layer.

Thus a greater production flexibility is given to the plants designed for tyre building. In fact, it is the Applicant's opinion that the expansion, of an adjustable amount depending on requirements, that is imposed by the radial expansion of the forming drum allows the annular reinforcing layer formed thereon to be given the sizes demanded by the design specifications of the tyre, without requiring the plant being fitting up with different machinery and equipment dedicated each to a specific size or a restricted range of sizes of the tyres being manufactured.

The Applicant further thinks that by the invention an excellent structural evenness and homogeneity of the obtained tyre can be also achieved. In fact, the expansion imposed to the annular reinforcing layers formed on the laying surface gives rise to thinning of the strip-like elements and of the individual cords, which thinning is homogeneously distributed over the whole circumferential extension.

In accordance with a further aspect, the invention relates to an apparatus for producing tyres, comprising: a forming drum externally having a substantially cylindrical laying surface, applicator devices to apply a plurality of strip-like elements onto the forming drum, which strip-like elements are disposed in mutually approached relationship over the whole circumferential extension of said laying surface, to form at least one first annular reinforcing layer; adjustment devices operating on the forming drum to selectively expand and contract it, while keeping its laying surface substantially cylindrical, between a first work diameter, at which each of the applied strip-like elements, on the laying surface subtends an arc of a circumference of a width as large as a submultiple integer of the overall circumferential extension of the laying surface itself, and a second work diameter greater than the first work diameter.

The present invention, in at least one of said aspects, can have one or more of the preferred features described hereinafter.

Formation of said first reinforcing layer can be aimed at manufacturing a belt structure of the tyre on an auxiliary drum constituting the forming drum.

In a different embodiment, formation of said first reinforcing layer can be aimed at manufacturing a carcass structure of the tyre on a primary building drum constituting the forming drum.

In another alternative embodiment, formation of said first reinforcing layer can be also aimed at manufacturing a belt structure and a carcass structure of the tyre on an auxiliary drum and a primary building drum, each of them constituting a forming drum.

Manufacture of said belt structure can further comprise the step of making a second reinforcing layer at a radially external position to said first reinforcing layer, on said auxiliary drum constituting the forming drum.

In a different embodiment, manufacture of said carcass structure may further comprise the step of making a second reinforcing layer at a radially external position to said first reinforcing layer, on said primary building drum constituting the forming drum.

In another embodiment, manufacture of said belt and carcass structures can further comprise the step of making a second reinforcing layer at a radially external position to said first reinforcing layer, on said auxiliary drum or said primary building drum, each constituting the forming drum.

The step of radially expanding the forming drum can be carried out after formation of the second annular reinforcing layer radially overlapping the first reinforcing drum.

Before or during the applying step, the following steps can be carried out: storing a first reference parameter corresponding to the first work diameter; storing a second reference parameter corresponding to the desired second work diameter; calculating the difference between said first and second reference parameters.

The radial-expansion amount of the forming drum can be advantageously modulated, by the adjustment devices for example, as a function of the calculated difference.

The difference between the circumferential extension of the forming drum set to the first and second work diameters respectively, is preferably smaller than the width of an individual strip-like element, so that separation between strip-like elements and contiguous individual cords, caused by expansion, is in any case of little amount and of such a nature that the structural strength of the obtained product is not impaired.

At least one annular insert of elastomeric material can be advantageously formed around the laying surface.

Said at least one annular insert of elastomeric material can be formed through winding of at least one continuous elongated element into coils disposed consecutively close to each other around the laying surface.

The annular insert can be applied to the laying surface before application of said strip-like elements, so as to promote steady positioning of the ends of said strip-like elements, by virtue of the sticky character of the elastomeric material constituting the insert.

Said at least one annular insert can be formed on the forming drum set to a minimum diameter, smaller than the first work diameter, so that the laying surface of said drum is as continuous as possible.

The forming drum is expanded from the minimum diameter to the first work diameter before application of the strip-like elements.

The forming drum preferably comprises consecutive circumferential sectors, radially movable upon command of the adjustment devices.

The sectors can have respective circumferential shoulders on the laying surface, which shoulders mutually abut when the drum is set to the minimum diameter so as to reduce the risks of the continuous elongated element breaking during winding on the laying surface.

Each circumferential sector can have comb-like end portions each operatively engaging in one comb-like end portion complementary thereto, carried by an adjacent circumferential sector, so as to reduce the size of the surface discontinuities produced between one sector and the other on the laying surface, following expansion of the drum.

The continuous elongated element, in parallel to a geometric axis of the forming drum can advantageously have a width greater than half one toothing pitch of each of the comb-like end portions, so that its structural conformation is not greatly affected by the surface discontinuities produced between one sector and the other on the laying surface, following expansion of the drum.

In addition or alternatively, at least one annular insert of elastomeric material can be applied to said at least one first and/or one second annular reinforcing layer, at a radially external position.

This annular insert can axially extend on the laying surface beyond the edges of said at least one first and/or one second annular reinforcing layers.

Winding of the continuous elongated element is preferably carried out starting from an intermediate point of the axial extension of said at least one first reinforcing layer that has been previously applied.

Said at least one annular insert may constitute at least one under-belt insert located at a radially internal position relative to an edge of said at least one first reinforcing layer.

In addition or alternatively, said at least one annular insert may constitute at least one tread band placed at a radially external position relative to said at least one first reinforcing layer.

In addition or alternatively, said at least one annular insert may constitute at least one sidewall extending in an axially external position relative to an edge of said at least one first reinforcing layer.

After said radial-expansion step, provision can be made for the steps of contracting the forming drum up to a diameter smaller than the first work diameter; and of axially removing from the forming drum by slipping, the annular reinforcing layer formed thereon.

Said adjustment devices preferably comprise at least one spiral cam engaging said sectors and drivable in rotation around a geometric axis of the forming drum to cause radial movement of said sectors.

Guide flanges slidably carrying said sectors can be rotatably supported relative to the spiral cam.

The spiral cam can be fastened to a grip shank coaxially carried by the forming drum.

At least one robotized arm can be provided for operating engagement of the forming drum at the grip shank.

A manipulator operatively carried by the robotized arm or installed separately can be provided for driving the grip shank in rotation and cause intervention of the adjustment devices.

Also provided can be locking devices that can be selectively activated to lock the guide flanges relative to the grip shank.

Each strip-like element applied onto the forming drum can be advantageously submitted to holding forces counteracting movements of the strip-like element relative to the laying surface, which forces are for example generated by the sticky character of the material forming said at least one annular insert and/or by magnets carried by said sectors.

Further features and advantages will become more apparent from the detailed description of a preferred but not exclusive embodiment of a process and an apparatus for producing tyres, in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

Referring to the drawings, an apparatus for producing tyres for vehicle wheels and provided for carrying out a process in accordance with the invention has been generally identified by reference numeral 1.

Apparatus 1 is designed to produce tyres 2 (FIG. 8) essentially comprising a carcass structure 2a having at least one carcass ply 3. An airtight layer of elastomeric material, i.e. a so-called liner 4, can be internally applied to the carcass ply/plies 3. Two annular anchoring structures 5, each comprising a so-called "bead core" 5a carrying an elastomeric filler 5b at a radially external position, are in engagement with respective end flaps 3a of the carcass ply/plies 3. Integration of the annular anchoring structures 5 takes place close to regions usually identified as "beads" 6, at which engagement between tyre 2 and a respective mounting rim usually occurs.

Figure 8:
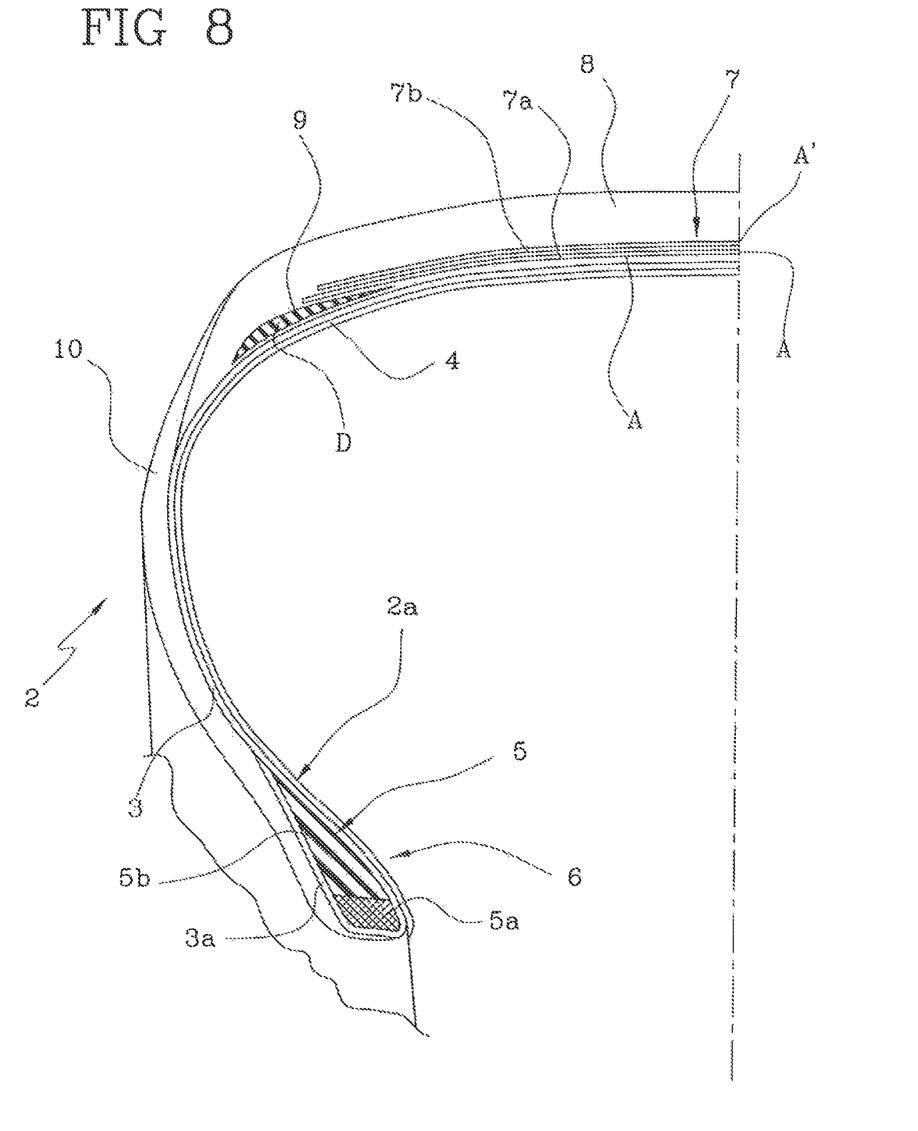
FIG. 8 is a fragmentary diametrical section of a tyre that can be produced through the process and apparatus in reference.

A belt structure 7 comprising one or more belt layers 7a, 7b is circumferentially applied to the carcass ply/plies 3, and a tread band 8 circumferentially overlaps the belt structure 7.

Associated with the belt structure 7 may be the so-called "under-belt inserts" 9 each placed between the carcass ply/plies 3 and one of the axially opposite end edges of the belt structure 7. In addition, or as an alternative to the under-belt inserts 9, annular inserts of elastomeric material and/or comprising cords or other reinforcing elements can be radially superposed on the belt structure 7, at least at the axially opposite end edges thereof, and/or interposed between the belt layers 7a, 7b, at least at said end edges.

Two sidewalls 10, each extending from the corresponding bead 6 to a corresponding side edge of the tread band 8, are applied to the carcass ply/plies 3, at laterally opposite locations.

Figure 1:
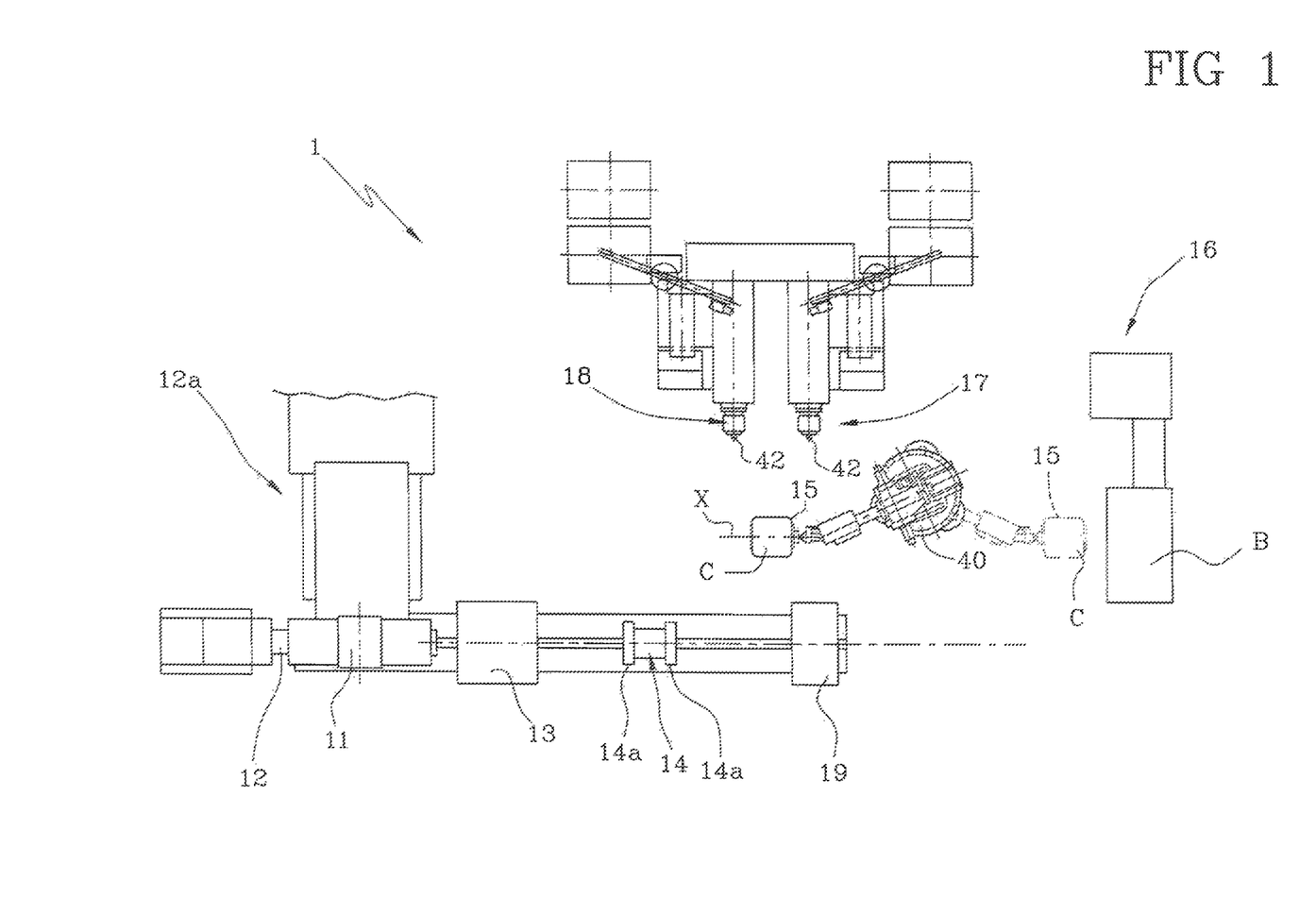
FIG. 1 diagrammatically shows a top view of an apparatus for producing tyres made in accordance with the present invention.

Apparatus 1 comprises a primary building drum 11, on which at least part of the components designed to form the carcass structure 2a of tyre 2 is build and/or assembled. The primary drum 11 can indifferently consist either of a first stage building drum if, as in the example herein shown, apparatus 1 is designed to carry out a building process of the so-called two-stage" type, or of a building drum of the type usually referred to as "unistage" if a building process in a single stage is wished to be carried out.

The primary drum 11 is operatively supported by a mandrel 12, a robotized arm, or another device enabling said drum, if necessary, to be driven in rotation and/or suitably moved during application of the components of the carcass structure 2a at a building station 12a.

In more detail, the primary drum 11 lends itself to first receive liner 4, if any, and then the carcass ply or plies 3, so as to form a cylindrical sleeve on the opposite end flaps of which the annular anchoring structures 5 are subsequently fitted. Turning-up of the end flaps 3a of the carcass ply/plies 3 can be afterwards carried out around the annular anchoring structures 5. Application of the sidewalls 10 onto the primary drum can be further provided, this operation being carried out before or after application of the carcass ply/plies 3, according to the building process.

In the embodiment shown where building of the tyre takes place by a two-stage process, the carcass structure 2a, made in the form of a cylindrical sleeve, is picked up from the primary drum 11 by a first transfer member 13 carrying out engagement of same on a shaping drum 14, or second-stage drum, axially divided into two halves 14a that can be moved close to each other and are provided to engage the carcass structure 2a, each at one of the annular anchoring structures 5.

Apparatus 1 further comprises an auxiliary drum 15 on which the components of the belt structure coming from a first feeding unit 16 are assembled following a pre-established sequence.

Also interlocked with the auxiliary drum 15 can be a second feeding unit 17 designed to apply the tread band 8 to the belt structure 7 at a radially external position.

A third feeding unit 18 can be provided for application of the sidewalls 10 in the continuation of the axially opposite edges of the tread band 8, as an alternative to application of the same on the primary drum 11.

A possible second transfer member 19 movable between the auxiliary drum 15 and shaping drum 14, preferably along a direction of mutual axial alignment of the same, carries out transfer of the belt structure 7 together with the tread band 8 and sidewalls 10 possibly associated to said tread band, onto the carcass structure 2a supported by the shaping drum 14.

In a manner known by itself, when the belt structure 7 is in a centred position relative to the carcass structure 2a, the opposite halves 14a of the shaping drum 14 are moved close to each other in an axial direction, simultaneously with admission of fluid into the carcass ply or plies 3, so as to shape the carcass structure 2a into a toroidal configuration. The resulting radial expansion of the carcass ply/plies 3 brings the same to adhere against the inner surface of the belt structure 7, held by the second transfer member 19.

Tyre 2 thus build is suitable for being removed from the shaping drum 14 to be submitted to a vulcanisation treatment and/or other working operations provided in the work cycle.

According to one embodiment of the present invention, it is provided that during building of tyre 2, at least one first annular reinforcing layer A constituting said at least one carcass ply 3 for example, and/or said at least one belt layer 7a, be made by means of applicator devices B provided for applying a plurality of strip-like elements 20 circumferentially disposed in mutually approached relationship on a forming drum C constituting said primary drum 11 and/or the auxiliary drum 15.

In more detail, in a possible alternative embodiment, the forming drum C constitutes the primary drum 11 dedicated to formation of the carcass structure 2a, and the applicator devices B constitute said building station 12a at least partly.

According to a different embodiment, both the carcass structure 2a and belt structure 7 are made using respective applicator devices B for strip-like elements 20 operating on forming drums C constituting said primary drum 11 and auxiliary drum 15, respectively.

In the particular instance shown and hereinafter described, the forming drum C constitutes the auxiliary drum 15 dedicated to formation of the belt structure 7, and the applicator devices B form part of the first feeding unit 16 of the components of the belt structure 7, the carcass structure 2a being formed on said primary drum 11.

Said applicator devices B, not described in detail for the sake of brevity, can be made, for example, following the teachings of U.S. Pat. No. 6,702,913 in the name of the same Applicant, when not otherwise stated in the present specification.

Figure 2:
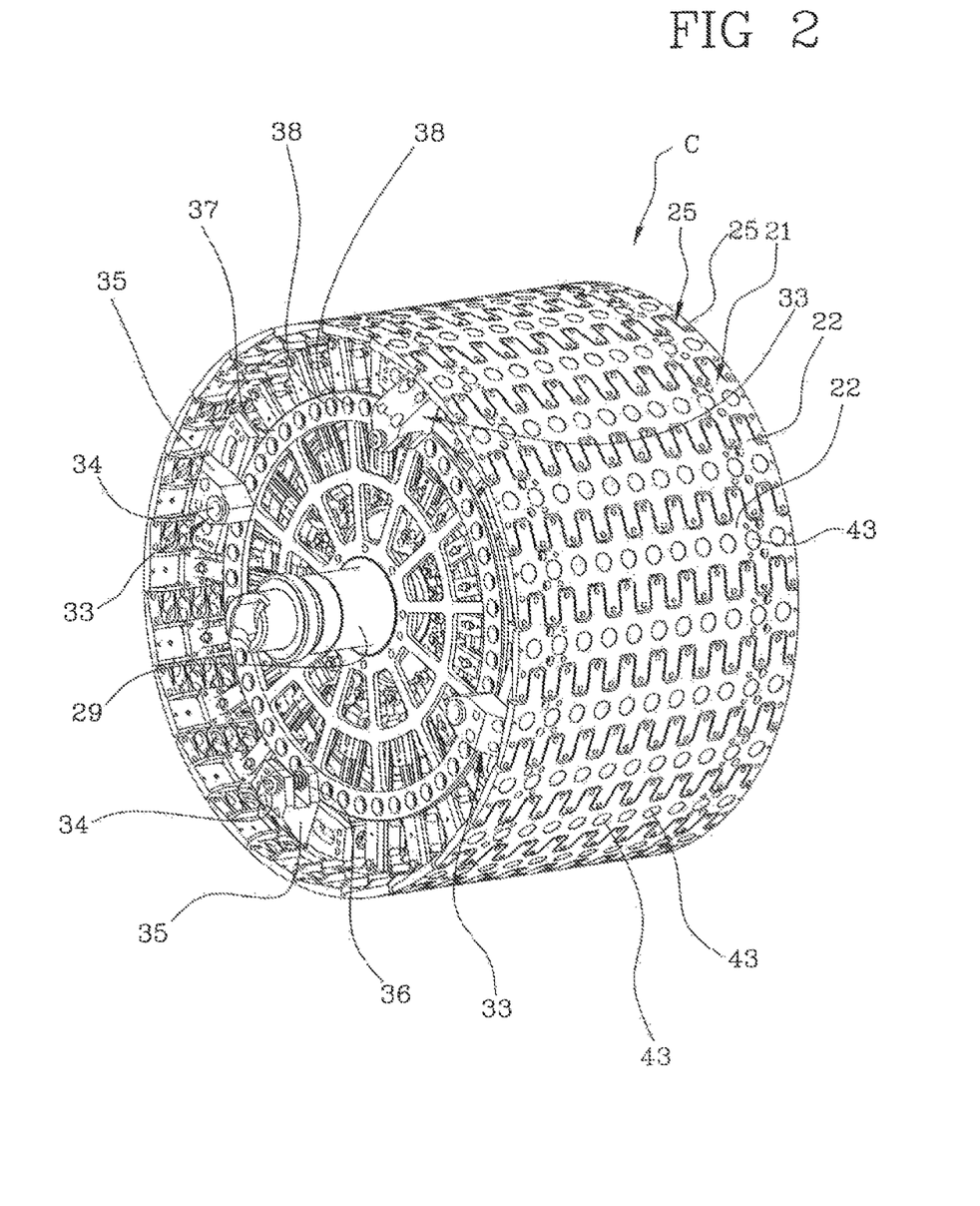
FIG. 2 is a perspective view of a forming drum being part of the apparatus in reference.
Figure 3:
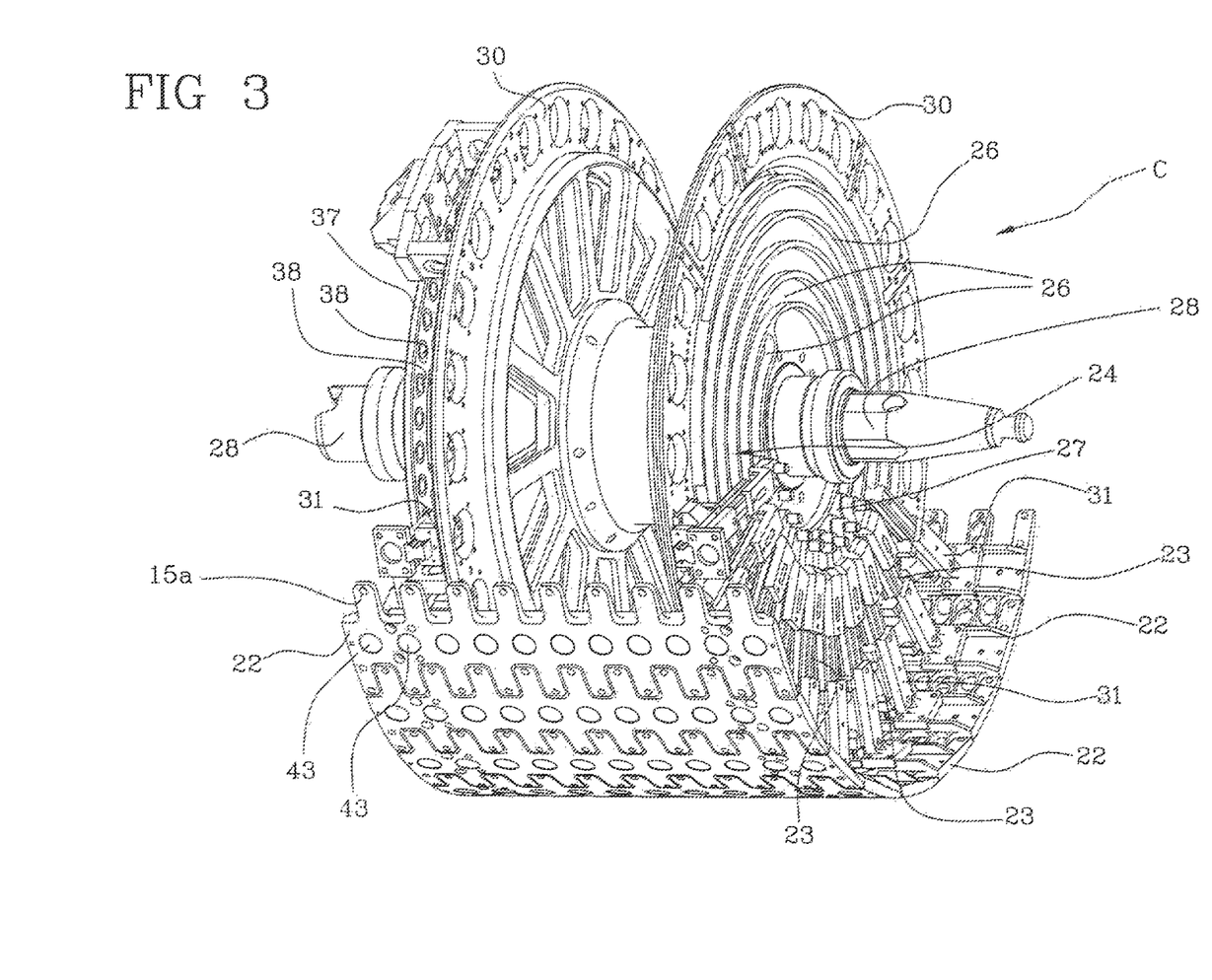
FIG. 3 shows the forming drum in a partly broken away perspective view, seen from the opposite angle with respect to FIG. 2.

The forming drum C externally has a laying surface 21 of substantially cylindrical conformation which is formed of a plurality of circumferential sectors 22 consecutively disposed around a geometric symmetry axis X of the forming drum itself.

Figure 4:
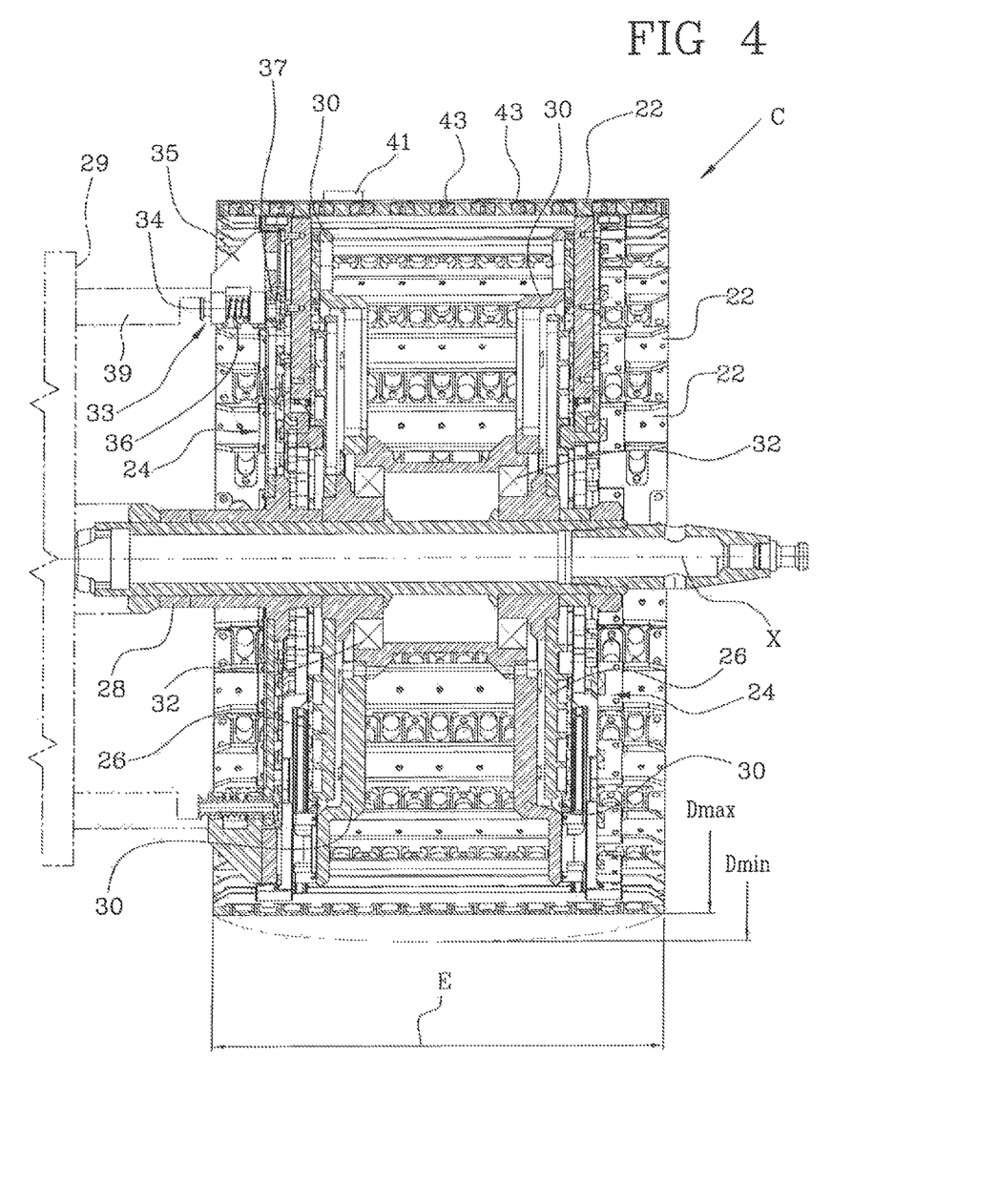
FIG. 4 is a diametrical section of the forming drum.

To the aims of the present invention, the expression "substantially cylindrical" drum means a drum corresponding to a solid of revolution defined by a generatrix having a rectilinear extension, as can be found in the example of the forming drum C herein shown, or having an arched profile to such a degree that the difference between a maximum diameter Dmax measurable at a plane of symmetry orthogonal to the rotation axis of the forming drum C, and a minimum diameter Dmin measurable at the axially opposite edges of the drum itself, is included between about 0 (cylindrical surface) and about 30% of the axial dimension E measurable between said axially opposite edges (FIG. 4).

In other words, the following relation applies:

$$0 =< (D\text{max} - D\text{min}) =< 0.3 * E.$$

Preferably said difference (Dmax−Dmin) is included between about 0 (cylindrical surface) and about 0.2*E.

In other words, preferably the following relation applies:

$$0 =< (D\text{max} - D\text{min}) =< 0.2 * E.$$

Each circumferential sector 22 is carried by at least one or, as shown, a pair of radial braces 23 located close to respective axially opposite sides of the forming drum C and operatively in engagement with devices 24 for adjustment of the radial positioning of the sectors themselves.

These adjustment devices 24 lend themselves to simultaneously translate the circumferential sectors 22 in a radial direction to the geometric axis X of the forming drum C, so as to give rise to a variation in the diametrical sizes of the drum itself, starting from a minimum diameter at which the circumferential sectors 22 can act in abutment against each other by respective circumferential shoulders 23a they are provided with at the laying surface 21, so as to give said surface a continuous extension.

Figure 5:
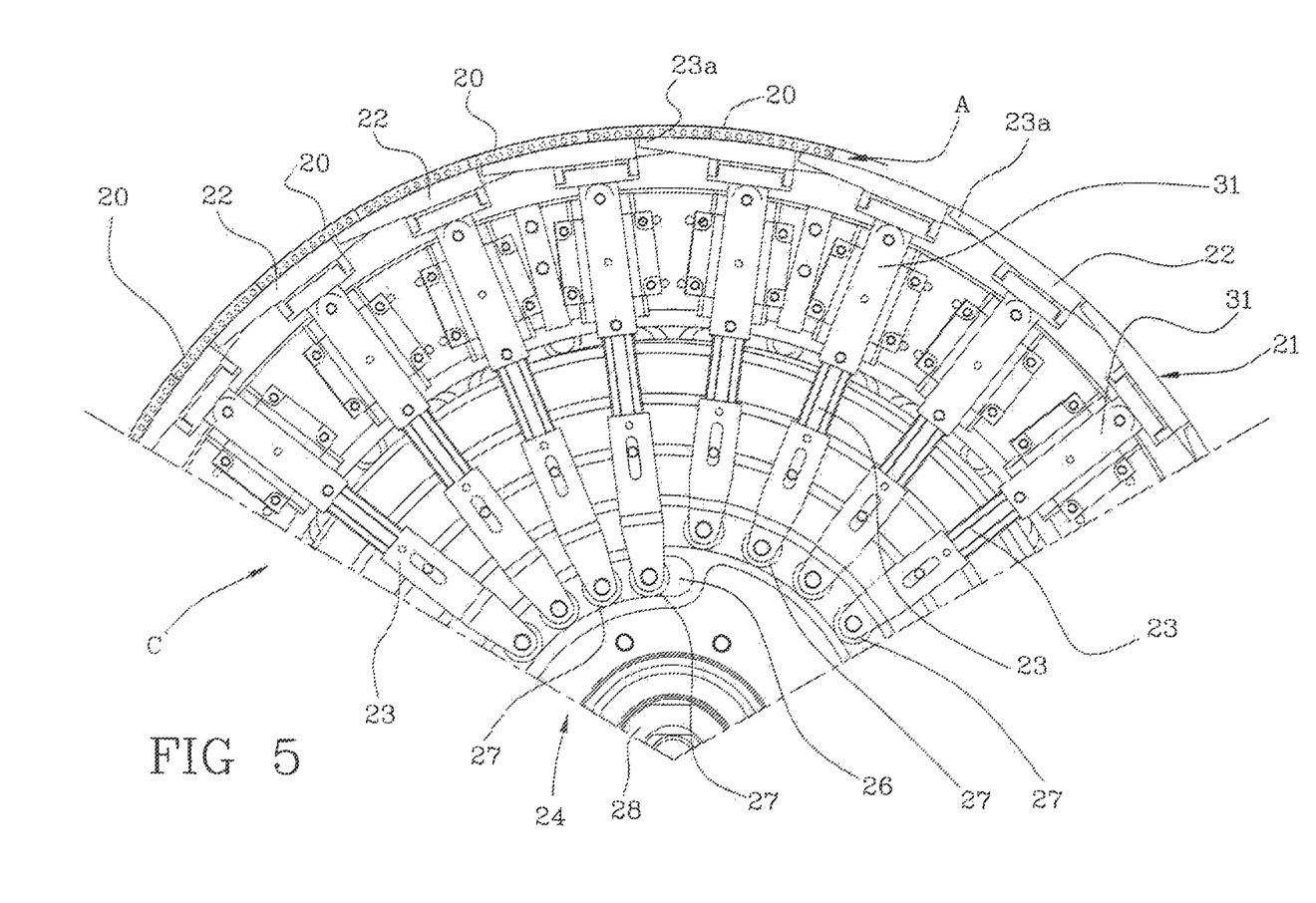
FIG. 5 shows a portion of the forming drum set to a first work diameter with some parts removed for rendering others more prominent.
Figure 6:
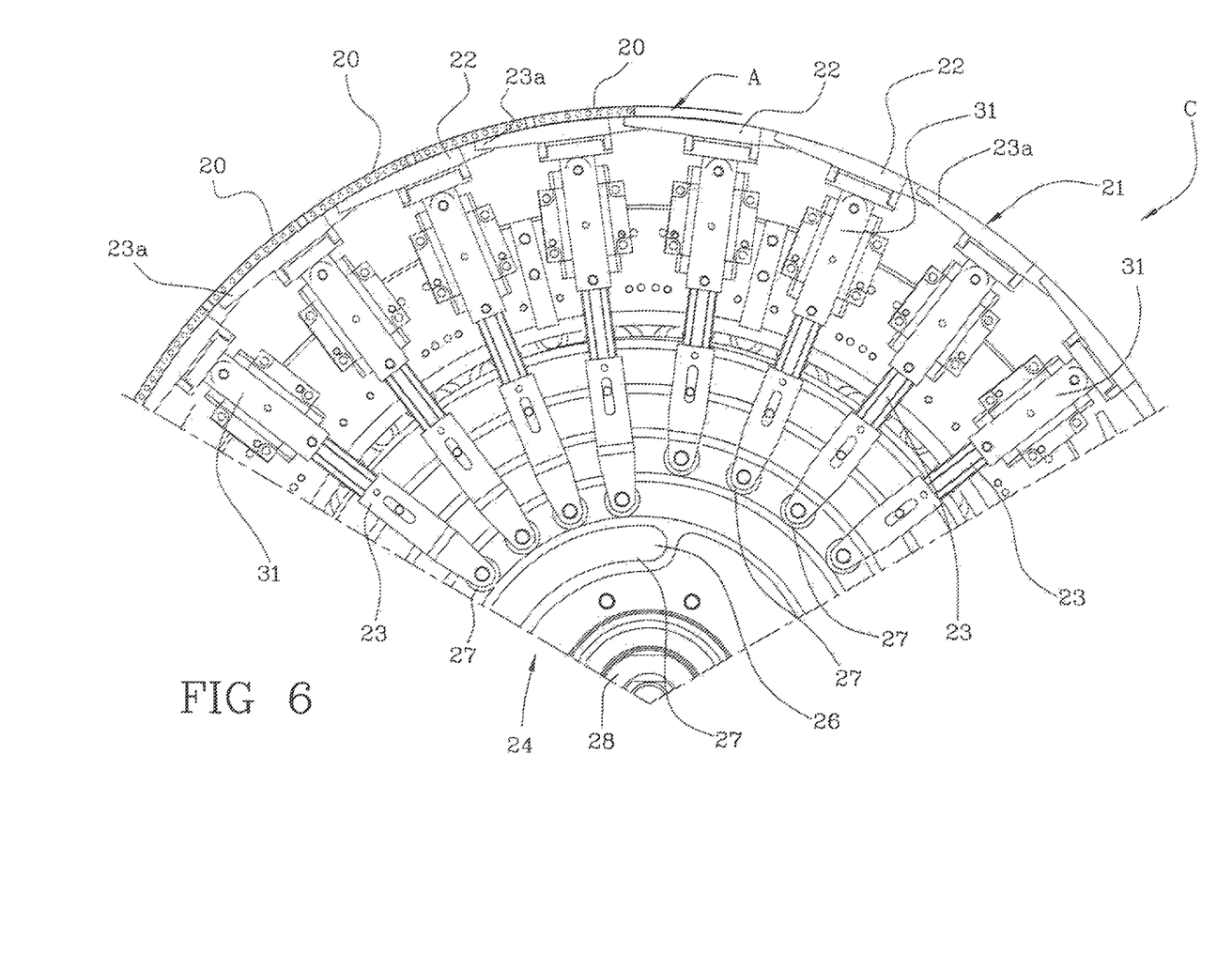
FIG. 6 shows the drum seen in FIG. 5, set to a second work diameter.

The circumferential shoulders 23a of each circumferential sector 22 are preferably defined at respective comb-like end portions 25, each operatively engaging in a comb-like end portion 25 geometrically complementary thereto, brought by a circumferentially adjacent circumferential sector 22. In this way, the laying surface 21 advantageously keeps its substantially cylindrical conformation and a substantially continuous extension, i.e. free from important discontinuities, also following a radial expansion of the forming drum C upon the action of the adjustment devices 24.

Figure 7:
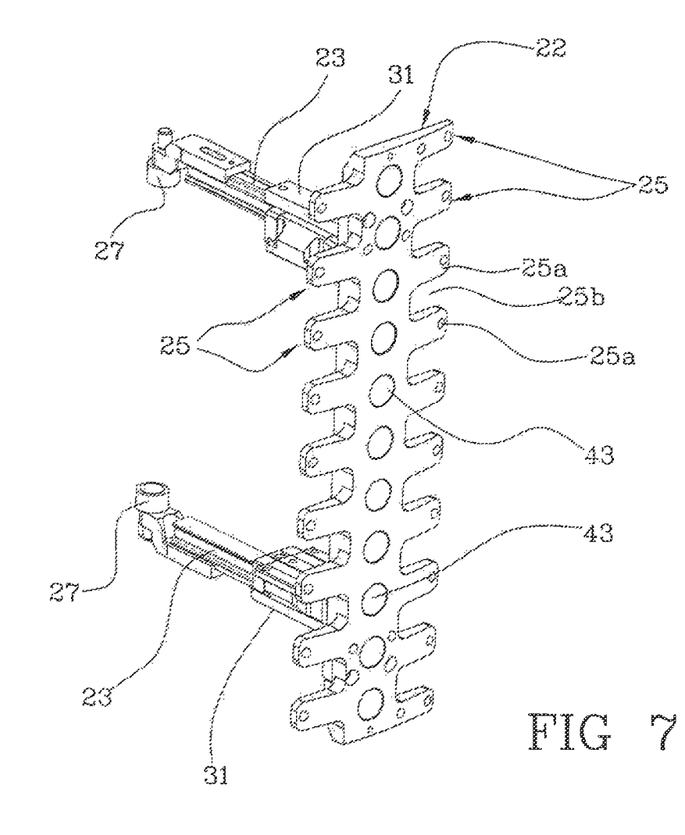
FIG. 7 is a perspective view of a construction detail of the forming drum.

In more detail, each comb-like end portion 25 is substantially defined by an alternation of projections 25a and recesses 25b, following each other according to a toothing pitch preferably included between about 10 mm and about 25 mm, measurable between homologous points of two mutually adjacent projections 25a.

It is to be observed that the comb-like ends 25 allow a good surface continuity to be maintained even when strong expansions of the forming drum C occur. Thus the forming drum C can be easily adapted to working of tyres having diametrical sizes even greatly different from each other.

The adjustment devices 24 preferably comprise at least one or, as shown, a pair of spiral cams 26 operatively engaging the circumferential sectors 22, at respective sliders 27 each carried by one of said radial braces 23. The spiral cams 26 each engage sliders 27 of the radial braces 23 disposed on the same side of the forming drum C and are fastened to a grip shank 28 coaxial with the geometric axis X, and drivable in rotation by a manipulator 29 that can be removably engaged with the forming drum C.

At least one or, as shown, a pair of guide flanges 30 support the circumferential sectors 22 radially guiding them relative to the geometric axis X by means of guide seats 31 slidably passed through by the respective radial braces 23. The guide flanges 30 are rotatably supported by the grip shank 28 through bearings 32, and at least one of them carries locking devices 33 to selectively unlock and lock the guide flanges relative to the grip shank 28.

These locking devices 33 can for example comprise one or more latches 34, each made in the form of a pin axially guided through a block 35 integral with the guide flange 30, elastically pushed by respective springs 36 towards a locking disc 37 integral with the grip shank 28 and carrying a plurality of circumferentially distributed fitting seats 38.

Each latch 34 can operatively engage with an unlocking actuator 39 carried by the manipulator 29, to be drawn out from the respective fitting seat 38 so as to disengage the grip shank 28 from the guide flange 30 in a rotation direction, said flange 30 being retained by the unlocking actuator itself. Under this situation, rotations of the grip shank 28 upon the action of the manipulator 29 are transmitted to the spiral cams 26, consequently causing a simultaneous radial movement of the circumferential sectors 22.

When intervention of the adjustment devices 24 is over, latches 34 are released from the unlocking actuators 39 to be each elastically pushed into one of the fitting seats 38, so as to promote steady positioning of the circumferential sectors 22 during working.

Preferably, at least one robotized arm 40 lends itself to operatively engage the grip shank 28 to support and conveniently move the forming drum C in front of the applicator devices B of the strip-like elements 20. In more detail, the robotized arm 40 carries out proper positioning of the forming drum C at the applicator devices B, and drives it in rotation, following a step-by-step motion for example, in synchronism with laying of the individual strip-like elements 20 onto the laying surface 21, so that the strip-like elements 20 themselves are applied in succession adjacent to each other, each following an orientation parallel or suitably inclined to the geometric axis X.

Preferably, said orientation will generate an angle included between about 0° and about 25° with the geometric axis X in the case of formation of a reinforcing layer belonging to a carcass ply.

Preferably, said orientation will generate an angle included between about 0° and about 900 with the geometric axis X in the case of formation of a reinforcing layer belonging to a belt strip.

Movement of the forming drum C takes place according to steps of an angular width substantially as large as or in any case correlated with the subtended angle, on the laying surface 21, by each of the strip-like elements 20 laid down. In this way, the opposite edges of respectively adjacent strip-like elements 20 will mutually mate or, if necessary, will be spaced apart by a predetermined and constant distance over the whole circumferential extension of the obtained reinforcing layer A.

In order to enable the last strip-like element 20 too, laid down for formation of the reinforcing layer A, to be suitably inserted between the previously applied adjacent strip-like elements 20, it is important that the arc of a circumference subtended by each strip-like element 20 on the laying surface 21 should correspond to a submultiple integer of the overall circumferential extension of the laying surface 21 itself.

The value of the subtended arc of a circumference is strictly connected to the width measure of the strip-like element 20 and can vary as a function of the orientation imposed to the strip-like element 20 itself during application.

Since the circumferential extension of the reinforcing layer A is a design parameter usually dictated by factors foreign to the width and orientation of the strip-like element 20, it may easily happen that the value of the arc of a circumference subtended by the strip-like element 20 does not correspond to a submultiple integer of the desired circumferential extension for the reinforcing layer A during manufacture.

Under this aspect, advantageously in the present invention before carrying out the step of applying the strip-like elements 20, the forming drum C is submitted to the action of manipulator 29 that will set the forming drum C to a first work diameter, having such a size that each of the strip-like elements 20 subsequently applied subtends an arc of a circumference on the laying surface 21 that is of a width substantially as large as a submultiple integer of the overall circumferential extension of the laying surface itself.

When manufacture of the first reinforcing layer A has been completed, at least one second reinforcing layer A' can be made at a radially external position to the first reinforcing layer. The second reinforcing layer A' that in the described example corresponds to the second belt layer 7b, can be obtained in the same manner as previously described, but with the strip-like elements 20 preferably oriented in a crossed extension with respect to those of the first reinforcing layer A corresponding to the first belt layer 7a. During manufacture of the second reinforcing layer A', the laying surface 21 of the forming drum C shall be represented by the previously formed first reinforcing layer A.

It will be appreciated that application of the strip-like elements 20 forming said at least one reinforcing layer A, A', preferably takes place according to a controlled angle with respect to the geometric axis X, as shown in U.S. Pat. No. 6,702,913 for example. This controlled angle can be fixed for the whole extension of the strip-like elements applied to the forming drum C, or can vary from the centre to the ends of the forming drum C itself.

When laying of the strip-like elements 20 has been completed, the forming drum C is radially expanded until a predetermined second work diameter, so as to impose a permanent expansion to the annular reinforcing layers A, A', in accordance with the desired circumferential extension determined by the design specifications.

It is also provided to this aim that operation of manipulator 29, operatively carried by the robotized arm 40 or installed separately therefrom, be governed by a programmable control unit (not shown), integrating devices for storing a first parameter corresponding to the first work diameter, possibly after determining the same based on the design parameters, devices for storing a second parameter corresponding to the desired second work diameter, and devices for calculating a difference between said first and second parameters. Upon command of said control unit, the adjustment devices 24 modulate the amount of the radial expansion imposed to the forming drum C, as a function of the difference detected by the calculation devices.

Preferably, the radial-expansion amount is advantageously contained within relatively low values, of such a magnitude that the difference between the circumferential extension of the forming drum C set to the first and second work diameters respectively, is smaller than the width of each strip-like element 20. The deformations imposed to the components made on the forming drum C are thus maintained within limited values, eliminating any risk of anomalous structural deformations being caused.

Before and/or after manufacture of the reinforcing layers/ layers A, A', at least one annular insert D of elastomeric material can be formed around the laying surface 21.

Said at least one annular insert D can for example constitute at least part of the tread band 8, applied to the first and/or second belt layers 7a, 7b at a radially external position, and/or at least part of the sidewalls 10, each extending on the laying surface 21 axially beyond the edges of said first and/or second belt layers 7a, 7b.

One or more annular inserts D of elastomeric material can also constitute the under-belt inserts 9 applied to the laying surface 21 at a radially internal position relative to the axially opposite edges of the belt layers 7a, 7b.

Each annular insert D can be advantageously made through spiraling of at least one continuous elongated element 41 of elastomeric material, i.e. by winding said continuous elongated element 41 into substantially circumferential coils, disposed mutually close to each other around the laying surface 21.

To this aim, the second and/or third feeding units 17, 18 can comprise at least one distributor 42, such as an extrusion die for example, delivering the continuous elongated element 41 onto the forming drum C while the latter is being driven in rotation around its geometric axis X by a motor carried by the robotized arm 40, and properly moved by the latter to cause distribution of the coils in a manner adapted to give the desired final conformation to the continuous elongated elements forming the under-belt inserts 9, the tread band 8 and/or the sidewalls 10 under manufacture.

At least during formation of the under-belt inserts 9 and/or the sidewalls 10, it is preferable for the forming drum C to be set to the minimum diameter corresponding to mutual contact of the circumferential sectors 22 in surface-continuity relationship. Thus it is eliminated the risk that the continuous elongated element 41 applied directly in contact with the forming drum C may break during winding, upon the effect of anomalous stresses caused by undesirable surface discontinuities of the forming drum C.

In order to limit the influence of possible surface discontinuities of the forming drum C on the structural integrity of the continuous elongated element 41, it is further preferably provided that at least during manufacture of the tread band 8 and/or the sidewalls 10, the continuous elongated element 41 be of a width, measurable in parallel to the geometric axis X of the forming drum C, larger that half the toothing pitch of each of the comb-like end portions 25 of the circumferential sectors 22.

It may be also advantageously provided that, at least during manufacture of the tread band 8 and/or the sidewalls 10, winding of the continuous elongated element 41 be carried out starting from an intermediate point of the axial extension of the previously applied first and/or second belt layers 7a, 7b.

When application of possible elements radially internal to the reinforcing layers A, A' (under-belt inserts 9, liner 4, for example) has been completed and before starting application of the reinforcing layers A, A', the forming drum C is advantageously expanded from its minimum diameter to the first work diameter, to enable correct lying of the strip-like elements 20.

For instance, due to the sticky character of the elastomeric material constituting the under-belt inserts 9 formed before manufacture of the belt layers 7a, 7b, each of the strip-like elements 20 subsequently applied onto the forming drum C is advantageously submitted to holding forces counteracting undesirable movements thereof relative to the laying surface 21.

Thus a steady positioning of the strip-like elements 20 can be obtained, even if the latter should be deliberately deformed during laying onto the forming drum C, in the same manner as taught in said document U.S. Pat. No. 6,702,913 in the name of the same Applicant.

Holding devices 43 can further be advantageously associated with the forming drum C to further ensure steady positioning of the strip-like elements 20 also in the presence of inner stresses.

In a preferential embodiment, these holding devices 43 comprise magnets associated with each circumferential sector 22 and facing up from the laying surface 21 to interact with the metallic material constituting the reinforcing cords integrated into the strip-like elements 20 used for manufacture of the reinforcing layers A, A', such as the first and/or second belt layers 7a, 7b for example.

Subsequently to the radial expansion step of the forming drum C to the second work diameter that, depending on requirements, can be carried out before or after laying of the tread band 8 and/or the sidewalls 10, the forming drum C can be contracted until a diameter smaller than the first work diameter. Under this circumstance, the belt structure 7, together with the thread band 8, the under-belt inserts 9 and possibly the sidewalls 10, can be axially slipped off the forming drum C brought to interact with the second transfer member by the robotized arm 40, so as to be associated with the carcass structure 2a.

The invention claimed is:

1. An apparatus for producing tyres, comprising:
 a forming drum externally having a substantially cylindrical laying surface;
 a grip shank coaxially carried by the forming drum;
 a manipulator configured for removably engaging the grip shank to drive the grip shank in rotation; and
 adjustment devices configured to operate on the forming drum to selectively expand and contract said forming drum, while keeping a laying surface thereof substantially cylindrical, between a first work diameter and a second work diameter greater than the first work diameter, wherein the forming drum comprises consecutive circumferential sectors radially movable upon command of the adjustment devices,
 the adjustment devices comprising:
  at least one spiral cam fastened to the grip shank and engaging the circumferential sectors and drivable in rotation around a geometric axis of the forming drum to give rise to a radial movement of the circumferential sectors;

at least one guide flange rotatably supported with respect to the grip shank and the at least one spiral cam and slidably carrying the circumferential sectors;

locking devices configured to be selectively activated for locking the at least one guide flange relative to the grip shank, wherein the locking devices comprise:

a locking disc integral with the grip shank;

at least one latch integral with the at least one guide flange and engageable with the locking disc; and an unlocking actuator carried by the manipulator;

wherein the at least one latch is operatively engageable with the unlocking actuator and operable for disengaging the grip shank from the at least one guide flange in a rotation direction while the at least one guide flange is retained by the unlocking actuator itself.

2. The apparatus as claimed in claim 1, wherein said forming drum comprises an auxiliary drum operatively associated with a first feeding unit of a belt structure.

3. The apparatus as claimed in claim 1, wherein said forming drum comprises a primary building drum operatively associated with a building station of a carcass structure.

4. The apparatus as claimed in claim 1, further comprising:

a programmable control unit configured to:

store a first reference parameter corresponding to the first work diameter;

store a second reference parameter corresponding to the desired second work diameter; and calculate a difference between said first and second reference parameters.

5. The apparatus as claimed in claim 4, wherein said adjustment devices modulate an amount of radial expansion of the forming drum, as a function of a difference calculated by the programmable control unit.

6. The apparatus as claimed in claim 1, further comprising devices configured to form at least one annular insert of elastomeric material around the laying surface.

7. The apparatus as claimed in claim 6, wherein said devices configured to form the at least one annular insert comprise a distributor for delivering a continuous elongated element, and a motor for driving the forming drum in rotation.

8. The apparatus as claimed in claim 1, wherein said adjustment devices operate on the forming drum to contract the forming drum to a diameter smaller than the first work diameter.

9. An apparatus as claimed in claim 1, wherein said circumferential sectors, on the laying surface thereof have circumferential shoulders abutting against each other when the drum is set to a minimum diameter.

10. The apparatus as claimed in claim 1, wherein each of said circumferential sectors has comb-like end portions each operatively engaging in a comb-like end surface complementary thereto, carried by a circumferentially adjacent circumferential sector.

11. The apparatus as claimed in claim 1, further comprising at least one robotized arm capable of operatively engaging the forming drum at the grip shank.

12. The apparatus as claimed in claim 11, wherein said manipulator is operatively carried by the robotized arm.

13. The apparatus as claimed in claim 1, further comprising holding devices for strip-like elements applied to the forming drum.

14. The apparatus as claimed in claim 13, wherein said holding devices comprise magnets associated with each circumferential sector.

15. The apparatus as claimed in claim 1, wherein:

the locking disc carries circumferentially distributed fitting seats; and the at least one latch comprises a block integral with the at least one guide flange and a pin elastically pushed towards the locking disc for engagement with the fitting seats.

* * * * *